(12) United States Patent
Smith et al.

(10) Patent No.: US 11,705,826 B2
(45) Date of Patent: Jul. 18, 2023

(54) CAPACITIVE COUPLER FOR HIGH VOLTAGE STEP-DOWN

(71) Applicants: Tyler D. Smith, Phoenix, AZ (US); John Patterson, Tempe, AZ (US); Clinton W. Ewell, Prescott, AZ (US)

(72) Inventors: Tyler D. Smith, Phoenix, AZ (US); John Patterson, Tempe, AZ (US); Clinton W. Ewell, Prescott, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 17/487,655

(22) Filed: Sep. 28, 2021

(65) Prior Publication Data

US 2022/0109377 A1 Apr. 7, 2022

Related U.S. Application Data

(60) Provisional application No. 63/198,179, filed on Oct. 1, 2020.

(51) Int. Cl.
*H02M 7/04* (2006.01)
*H02M 7/219* (2006.01)

(52) U.S. Cl.
CPC ............. *H02M 7/05* (2021.05); *H02M 7/219* (2013.01)

(58) Field of Classification Search
CPC ................................ H02M 7/05; H02M 7/219
See application file for complete search history.

(56) References Cited

U.S. PATENT DOCUMENTS

| | | | | |
|---|---|---|---|---|
| 7,602,158 B1 * | 10/2009 | Iacob | ................ | H02M 3/33523 307/17 |
| 9,509,219 B2 * | 11/2016 | Inukai | ..................... | G03G 15/80 |
| 2006/0126368 A1 * | 6/2006 | Rapeanu | ............... | H02M 7/066 363/89 |

* cited by examiner

*Primary Examiner* — Jue Zhang
(74) *Attorney, Agent, or Firm* — Snell & Wilmer L.L.P.

(57) ABSTRACT

Systems and methods for a capacitive coupler for high-voltage step-down include an actively-controlled current-steering circuit connected in series with a current-limiting capacitor in order to transform a higher and potentially variable AC voltage to a lower regulated DC voltage. The actively-controlled current-steering circuit includes a switching element which, during operation, is predominantly either fully open or fully closed, and comparatively spends only a small fraction of operating time in a transition-state between the open and closed positions.

19 Claims, 3 Drawing Sheets

CAPACITIVE COUPLER FOR HIGH VOLTAGE STEP-DOWN

CROSS REFERENCE TO RELATED APPLICATIONS

This application claims priority to, and the benefit of, U.S. Provisional Patent Application Ser. No. 63/198,179, entitled "CAPACITIVE COUPLER FOR HIGH VOLTAGE STEP-DOWN," filed on Oct. 1, 2020. The content of the foregoing application is hereby incorporated by reference (except for any subject matter disclaimers or disavowals, and except to the extent of any conflict with the disclosure of the present application, in which case the disclosure of the present application shall control).

TECHNICAL FIELD

The present disclosure relates to voltage step-down, and in particular to use of capacitive coupling to harvest energy from high voltage power lines.

BACKGROUND

Prior voltage step-down systems have suffered from various deficiencies. Accordingly, improved voltage step-down systems and methods remain desirable.

SUMMARY

A capacitive coupler for high-voltage step-down is disclosed, comprising an actively-controlled current-steering circuit connected in series with a current-limiting capacitor. The actively-controlled current-steering circuit comprises a switching element, a blocking diode, and a storage capacitor.

In various embodiments, the switching element is voltage-controlled. In various embodiments, the capacitive coupler further comprises regulation electronics configured to control the switching element. In various embodiments, the capacitive coupler further comprises a full-wave bridge rectifier. In various embodiments, the full-wave bridge rectifier is configured to convert an AC input current into a DC current.

In various embodiments, the full-wave bridge rectifier is coupled between the current-limiting capacitor and the actively-controlled current-steering circuit. In various embodiments, the storage capacitor is configured to receive the DC current from the full-wave bridge rectifier. In various embodiments, the capacitive coupler further comprises a switched-mode power supply. In various embodiments, the capacitive coupler further comprises a relay and a resistive dropper, wherein the relay is configured to open the resistive dropper.

In various embodiments, the capacitive coupler further comprises regulation electronics configured to control the switching element, wherein the switched-mode power supply is configured to power the regulation electronics.

A method for using a capacitive coupler for high-voltage step-down is disclosed, the method comprising coupling, to a high voltage alternating current power line, a capacitive coupler, activating the capacitive coupler to generate a DC voltage, and applying the DC voltage to a load to power the load. The capacitive coupler comprises an actively-controlled current-steering circuit comprising a switching element, a blocking diode, and a storage capacitor, and a current-limiting capacitor connected in series with the actively-controlled current-steering circuit.

In various embodiments, the method further comprises powering the actively-controlled current-steering circuit with a switched-mode power supply. In various embodiments, the method further comprises opening a relay, and placing a resistive dropper in an open circuit condition in response to the relay opening.

In various embodiments, the method further comprises switching the switching element between an open position and a closed position. In various embodiments, the method further comprises opening the switching element to charge the storage capacitor. In various embodiments, the step of opening the switching element is performed in response to the storage capacitor falling below a predetermined threshold charge. In various embodiments, the method further comprises closing the switching element. The switching element may be closed in response to the storage capacitor exceeding a predetermined threshold charge.

A capacitive coupler for high-voltage step down is disclosed, comprising a switching element, a blocking diode, a storage capacitor, and a current-limiting capacitor configured to supply an AC current to the switching element. The switching element is configured to convert the AC current into a DC current. The storage capacitor is configured to be charged by the DC current in response to the switching element switching to an open state. The blocking diode is configured to prevent discharging of the storage capacitor when the switching element is in a closed state.

In various embodiments, the capacitive coupler further comprises regulation electronics for controlling the switching element, and a power supply configured to supply power to the regulation electronics. In various embodiments, the capacitive coupler further comprises a resistive dropper, a relay switchable between an open relay state and a closed relay state, wherein the resistive dropper is configured to supply power to the regulation electronics when the relay is in the closed relay state.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

With reference to the following description and accompanying drawings.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for voltage regulation, capacitive coupling, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical system or components or methods thereof.

Figure 1:
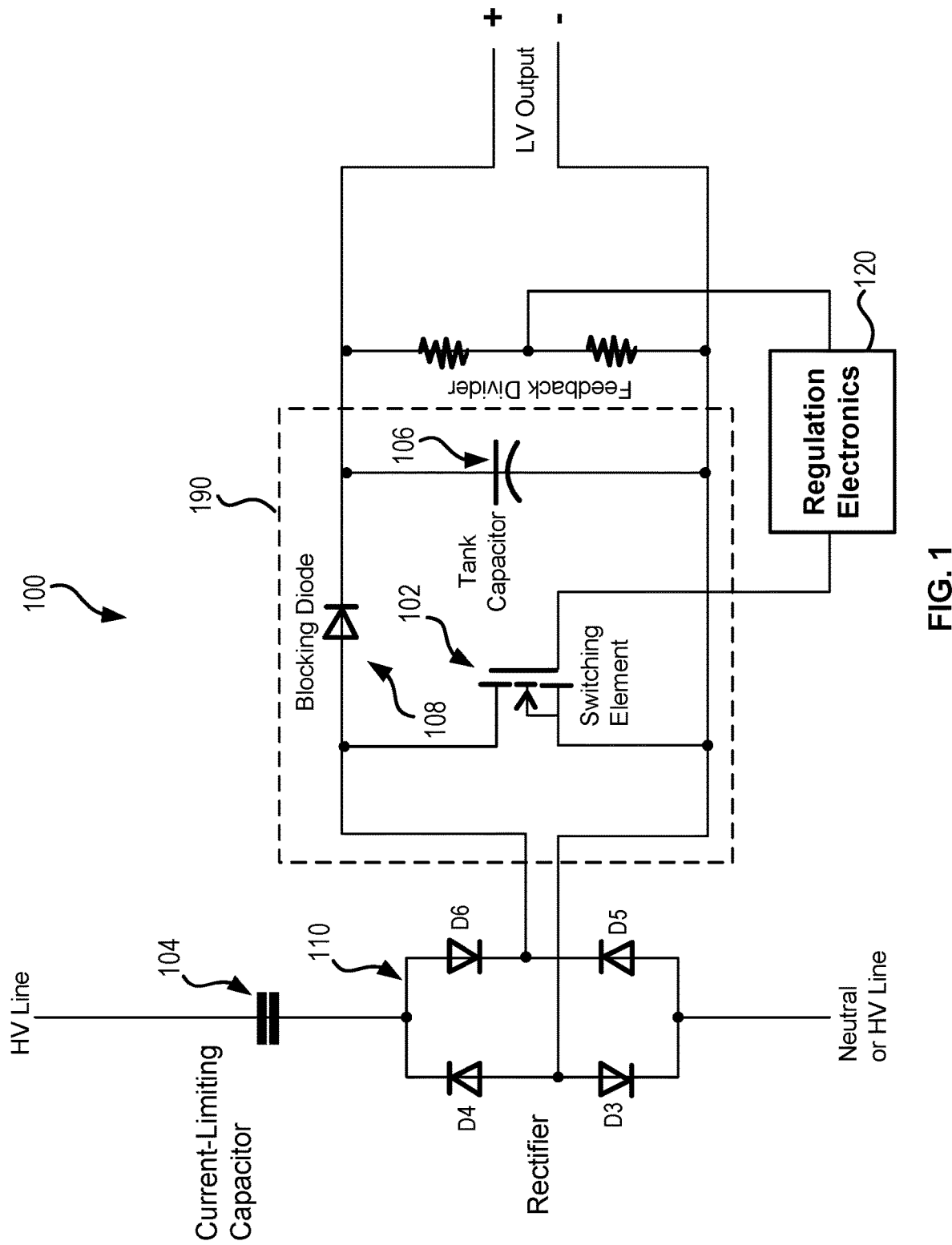
FIG. 1 illustrates an exemplary circuit diagram of a capacitive coupler system in accordance with an exemplary embodiment.

With reference now to FIG. 1, principles of the present disclosure contemplate novel systems and methods for high voltage step-down utilizing capacitive coupling. In various exemplary embodiments, principles of the present disclosure contemplate a system 100 and components thereof.

Capacitive dropper circuits are employed when a low DC voltage, typically at a low current, must be obtained inexpensively and reliably from a high AC voltage. Capacitive dropper circuits are notable for their low consumption of active power relative to the current that they are able to supply, and are notable for their ability to supply reactive power to AC power systems, which in certain cases may be used to aid in local power-factor correction. Additionally, in some cases capacitors may be lighter and potentially less expensive, per unit power transfer, than magnetic transformers. For very high input voltages, capacitors may in general be preferable to magnetic transformers for converting small amounts of power to a lower voltage, as is seen in CCVTs (capacitive-coupled voltage transformers).

However, traditional capacitive dropper circuits typically utilize a passive shunt element to perform voltage regulation at the DC output. This element carries the full dropper capacitor current at all times, and as a result dissipates power when no or little load is applied to the circuit. This wastes energy during light-load periods of operation, and additionally limits the power capacity of larger dropper circuits to that which is reasonably able to be dissipated by a passive regulator element such as a pass transistor or Zener diode.

In contrast, principles of the present disclosure contemplate an active capacitive dropper design employing a switched-mode regulator (i.e., see switching element 102) as described herein. Consequently, comparatively little power is dissipated in a regulating element 102 (also referred to herein as a switching element, a switching MOSFET, or a shunt element) as it is predominantly either fully open or fully closed, and spends only a small fraction of operating time in a transition-state between open and closed. During light-load conditions, the switching element 102 will be predominantly closed, bypassing most of the dropper capacitor 104 current around the storage capacitor 106 (also referred to herein as a tank capacitor). In this state (i.e., with switching element 102 predominately closed), the entire circuit will approximate a pure capacitor, with very low active power dissipation, and therefore very little energy will be wasted. During heavy-load conditions, the switching element 102 will be predominantly open, allowing most of the dropper capacitor 104 current to flow into the storage capacitor 106 and the load (i.e., at LV Output). In this state (i.e., with switching element 102 predominately open), the circuit will consume active power; however, most of this power will be delivered to the load (i.e., a load may be connected at the low voltage (LV) output) and put to use. Again, very little energy will be wasted in the dropper circuit itself. In between light and heavy load, the switched-mode element (i.e., switching element 102) will open and close at a finite frequency dependent on voltage regulation tolerance as well as storage capacitor 106 size. This "finite frequency" is not necessarily pre-programmed based on the above factors. Rather, a frequency (Hz) may never be set. Rather, the switching element 102 is opened and closed as desired by the regulation electronics 120 to ensure the LV output stays within an acceptable range. The resulting frequency may vary—even during device operation—based on load, capacitor size, acceptable LV output range, and dropper capacitor current. Provided the switching frequency is not too great, wasted energy will still remain low. In general, lower frequency of transitions from open to closed will correspond to lower overall loss, and therefore higher efficiency.

Based on these design considerations, in most cases exemplary systems as disclosed herein can be configured to operate at greater efficiency than an equivalent passive shunt-regulated capacitive coupler over most load ranges, and especially at lighter loads.

In exemplary system 100, the capacitive coupler creates usable voltage for small electronics by harvesting energy from high-voltage power lines. In short, the circuit rapidly switches to create output voltage within a desired range. This allows the device to power items such as telecommunications equipment, electrical line maintenance tools, charging stations for electric cars or drones, and the like. The system is compact and minimalist, allowing for easy field implementation.

In an exemplary embodiment, an active capacitive coupler utilizes an actively-controlled current-steering circuit (outlined by dashed line 190) in series with current-limiting capacitor 104 (also referred to herein as a dropper capacitor) in order to transform a higher and potentially variable AC voltage (see HV Line) to a lower regulated DC voltage (LV Output). Actively-controlled current-steering circuit 190 includes switching element 102, storage ("tank") capacitor 106, and blocking diode 108. The topology intrinsically limits the maximum voltage across switching element 102 and diodes (i.e., diodes D3-D6) of rectifier 110 to that of the DC output voltage (LV Output), and as such may be used to transform very high AC voltages (limited by the dropper capacitor 104 rating only) to low DC voltage.

The capacitive coupler (i.e., system 100) may be utilized as a means to create drone charging stations along high-voltage lines. This implementation utilizes an efficient, compact means of converting high voltage electricity to a more usable voltage range. Moreover, exemplary embodiments may be used to power various types of small electronics. Thus, principles of the present disclosure are not only important for drone infrastructure, but also provide value to utility companies by allowing them to power mobile equipment without gasoline generators.

The capacitive coupler (i.e., system 100) may be utilized as a means for powering telecommunications and repair equipment for utility workers servicing power lines. The capacitive coupler (i.e., system 100) may be utilized as a means for powering recharge stations for electric vehicles and/or drones, for example in remote locations along high-voltage lines.

In an exemplary embodiment, in system 100 when the desired output voltage (VOUT) is significantly lower than the AC input voltage (HV IN), the capacitor 104 behaves as an approximate AC current source. A full-wave bridge rectifier 110 is used to convert this AC current into DC current, and the DC current is permitted to flow into a low-voltage, high-value storage capacitor 106 for further use by the load. For example, a load may be connected between +LV (350V) and −LV (GND) in FIG. 2B (equivalent to LV Output in FIG. 1).

The charging rate of the storage capacitor 106 is controlled using a voltage-controlled switching element 102. In various embodiments, voltage-controlled switching element 102 is a switched-mode shunt element (e.g., a MOSFET, a BJT, an IGBT, etc.) is connected across the DC-side of the full-wave bridge rectifier 110. Blocking diode (D7) 108 is used between the rectifier 110 and the storage capacitor 106 to prevent discharging of the storage capacitor 106 when the switching element 102 closes. When the voltage of the storage capacitor 106 has exceeded an upper limit of regulation, the switching element 102 is closed, resulting in the voltage across the DC side of the full-wave bridge rectifier 110 being reduced to zero and the current from the rectifier 110 being steered away from the storage capacitor 106. When the voltage of the storage capacitor 106 falls below a lower limit of regulation, the switching element 102 is re-opened and the current may again charge the storage capacitor 106.

However, when the dropper capacitor 104 is initially connected to a rigid high-voltage power source, a large transient current may be produced through the dropper capacitor 104. For this reason, it may be desirable to place a low-value pulse-withstanding resistor (see resistor 112 of FIG. 2B) in series with the dropper capacitor 104 in order to ensure that an initial inrush current remains within the absolute maxima of the diodes of rectifier 110, switching element 102, and dropper capacitor 104 if the system is installed on a live circuit.

In various exemplary embodiments, system 100 utilizes circuitry (e.g., regulation electronics 120) to control the rapid charging and discharging of a high-voltage capacitor (i.e., storage capacitor 106). Specifically, the device uses switching element 102 to switch on/off power to the circuit based on the output voltage. This can be achieved with active control from a microcontroller (MCU) or by using a window comparator and latching circuitry (outlined by dashed lines 192 in FIG. 2A and FIG. 2B).

Figure 2A:
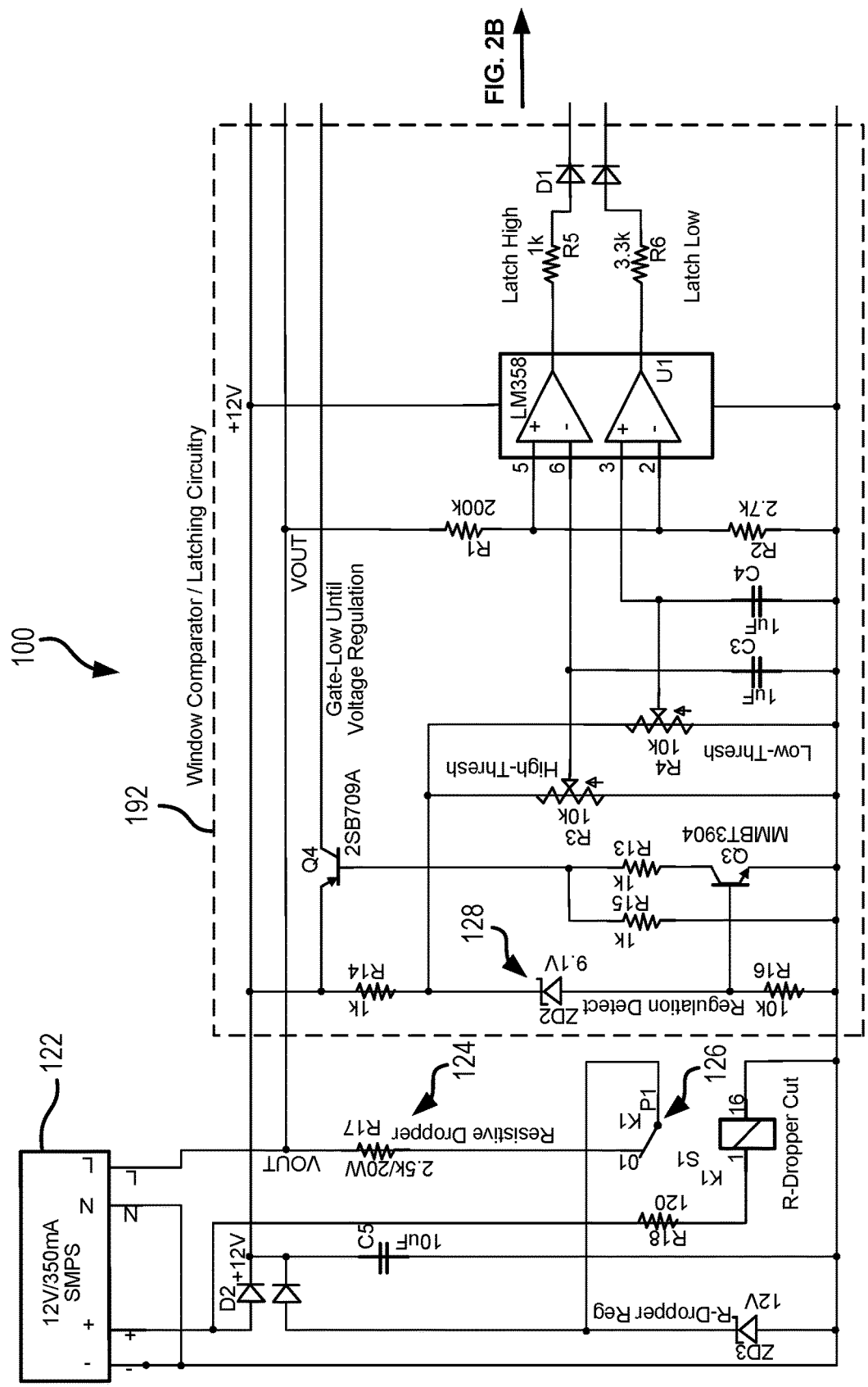
FIG. 2A and FIG. 2B illustrate an exemplary circuit diagram of the capacitive coupler system of FIG. 1, including details of the regulation electronics in accordance with an exemplary embodiment.
Figures 2A, 2B:
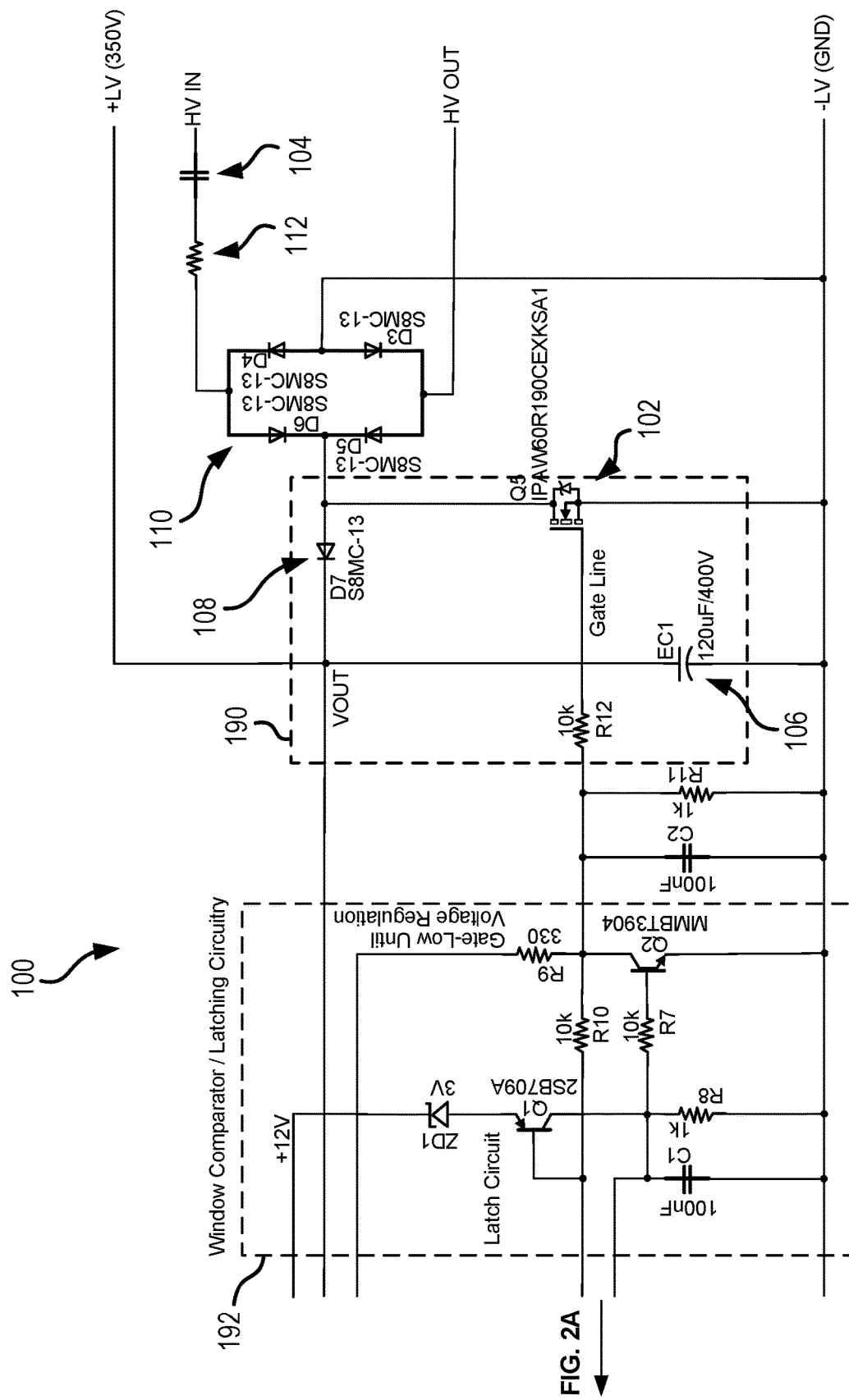

With combined reference to FIG. 2A and FIG. 2B, additional details of regulation electronics 120 are illustrated when regulation electronics 120 includes a window comparator and latching circuitry. However, it should be understood that the window comparator and latching circuitry may be replaced with a microcontroller (MCU) without departing from the scope of the present disclosure.

Safe startup of the voltage regulation circuitry in the active capacitive coupler is also important for reducing the risk of overvoltage at the DC output due to startup delays in the regulation circuitry, and to reducing the risk of damage to the switching element due to prolonged partial-turn-on. Thus, system 100 may include a lossy resistive dropper 124 to ensure the regulation electronics 120 are powered before the remainder of the system comes online. Lossy resistive dropper 124 may be coupled between storage capacitor 106 and the regulation electronics 120 to "step-down" the voltage supplied to the regulation electronics 120 from storage capacitor 106. In an exemplary embodiment, the voltage across lossy resistive dropper 124 drops from about 350V to about 12V. After the remainder of the system comes online, switched-mode power supply (SMPS) 122 provides the primary source of power to the regulation electronics 120 by converting the high DC voltage supplied by storage capacitor 106 to a voltage (e.g., 12V) suitable for regulation electronics 120. In various embodiments, regulation electronics 120 will consist of the window comparator and latching circuitry 192 (see FIG. 2A and FIG. 2B). In various embodiments, regulation electronics 120 will consist of a microcontroller (MCU). Stated differently, window comparator and latching circuitry 192 may be replaced with an MCU. Furthermore, since this power supply 122 may have a startup delay (e.g., a one-second startup delay), lossy resistive dropper (R17) 124 may also be used to provide immediate 12-volt power to the regulation electronics 120. Upon activation of the 12V power supply 122, a relay 126 is used to open the lossy resistive dropper 124, thereby eliminating the energy waste that it would otherwise cause during normal use. Stated differently, the addition of a separate power supply (i.e., via lossy resistive dropper 124) for use during start-up, as discussed herein, prevents the output voltage of system 100 from exceeding acceptable levels before the regulation electronics 120 come online, thereby preventing damage to the load and/or the capacitive coupler itself. Providing power supply 122, resistive dropper 124, and relay 126 as shown overcomes this potential issue.

Moreover, in order to reduce the risk of partial turn-on in the switching element 102 as the storage capacitor 106 voltage initially rises, a 9.1-volt Zener diode (ZD2) 128 may be used to enforce a "gate-low until regulation is achieved" policy. 9.1 volts may be utilized because it is less than the 12-volt nominal operating voltage of the power supplies but is higher than the minimum gate voltage. However, it will be appreciated that this design can be modified to suit the specific needs of a particular load.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A capacitive coupler for high-voltage step-down, comprising:
   an actively-controlled current-steering circuit comprising a switching element, a blocking diode, and a storage capacitor;
   a current-limiting capacitor connected in series with the actively-controlled current-steering circuit;
   a full-wave bridge rectifier coupled between the current-limiting capacitor and the actively-controlled current-steering circuit, wherein the full-wave bridge rectifier is configured to convert an AC input current into a DC current, and the storage capacitor is configured to receive the DC current from the full-wave bridge rectifier;
   a relay;
   a resistive dropper, wherein the relay is configured to open the resistive dropper; and
   a regulation electronics configured to control the switching element,
   wherein the resistive dropper is coupled between the storage capacitor and the regulation electronics, and the storage capacitor is configured to supply a voltage to the regulation electronics via the resistive dropper.

2. The capacitive coupler of claim 1, wherein the switching element is voltage-controlled.

3. The capacitive coupler of claim 1, further comprising regulation electronics configured to control the switching element.

4. The capacitive coupler of claim 1, further comprising a switched-mode power supply.

5. The capacitive coupler of claim 4, wherein the switched-mode power supply is configured to power the regulation electronics.

6. The capacitive coupler of claim 1, wherein the storage capacitor is configured to supply the voltage to the regulation electronics via the resistive dropper in response to the relay being closed.

7. A method for using a capacitive coupler for high-voltage step down, the method comprising:
   coupling, to a high-voltage alternating current power line, a capacitive coupler, wherein the capacitive coupler comprises an actively-controlled current-steering circuit comprising a switching element, a blocking diode, and a storage capacitor, and a current-limiting capacitor connected in series with the actively-controlled current-steering circuit;
   activating the capacitive coupler to generate a DC voltage;
   applying the DC voltage to a load to power the load; and
   opening the switching element to charge the storage capacitor in response to the storage capacitor falling below a predetermined threshold charge.

8. The method of claim 7, further comprising powering the actively-controlled current-steering circuit with a switched-mode power supply.

9. The method of claim 8, further comprising:
   opening a relay; and
   placing a resistive dropper in an open circuit condition in response to the relay opening.

10. The method of claim 9, further comprising:
    converting an AC input current into a DC current using a full-wave bridge rectifier;
    supplying the AC current to the full-wave bridge rectifier via a current-limiting capacitor, wherein the full-wave bridge rectifier is coupled between the current-limiting capacitor and the actively-controlled current-steering circuit;
    controlling the switching element with a regulation electronics, wherein the switching element is opened with the regulation electronics; and
    wherein the resistive dropper is coupled between the storage capacitor and the regulation electronics.

11. The method of claim 10, further comprising supplying, by the storage capacitor, the DC voltage to the regulation electronics via the resistive dropper.

12. The method of claim 9, further comprising closing the switching element to in response to the storage capacitor exceeding a second predetermined threshold charge.

13. The method of claim 7, further comprising switching the switching element between an open position and a closed position.

14. The method of claim 7, further comprising closing the switching element.

15. The method of claim 7, further comprising:
    controlling the switching element with a regulation electronics; and
    supplying a voltage to the regulation electronics via a resistive dropper disposed between the storage capacitor and the regulation electronics.

16. The method of claim 7, further comprising coupling a full-wave bridge rectifier between the current-limiting capacitor and the actively-controlled current-steering circuit,
    wherein the full-wave bridge rectifier is configured to convert an AC input current into a DC current, and
    wherein the storage capacitor is configured to receive the DC current from the full-wave bridge rectifier.

17. A capacitive coupler for high-voltage stepdown, comprising:
    a switching element;
    a blocking diode;
    a storage capacitor; and
    a current-limiting capacitor configured to supply an AC current to the switching element,
    wherein the switching element is configured to convert the AC current into a DC current,
    wherein the storage capacitor is configured to be charged by the DC current in response to the switching element switching to an open state and the switching element is configured to switch to the open state to charge the storage capacitor in response to the storage capacitor falling below a first predetermined threshold charge, and
    wherein the blocking diode is configured to prevent discharging of the storage capacitor when the switching element is in a closed state.

18. The capacitive coupler of claim 17, further comprising:
    regulation electronics for controlling the switching element; and
    a power supply configured to supply power to the regulation electronics.

19. The capacitive coupler of claim 18, further comprising:
    a resistive dropper; and
    a relay switchable between an open relay state and a closed relay state, wherein the resistive dropper is configured to supply power to the regulation electronics when the relay is in the closed relay state; and wherein the resistive dropper is coupled between the storage capacitor and the regulation electronics.

\* \* \* \* \*